United States Patent [19]

Shumaker

[11] Patent Number: 5,071,659

[45] Date of Patent: Dec. 10, 1991

[54] FISH ATTRACTANT

[76] Inventor: Donald L. Shumaker, 2310 Armil Pl., Davenport, Iowa 52804

[21] Appl. No.: 398,029

[22] Filed: Aug. 24, 1989

[51] Int. Cl.$^5$ ............................................. A01K 85/00
[52] U.S. Cl. ................................... 426/1; 43/4.5; 43/42
[58] Field of Search ......................... 43/1, 4, 4.5, 42; 426/1

[56] References Cited

U.S. PATENT DOCUMENTS

| | | | |
|---|---|---|---|
| 3,607,294 | 9/1971 | Ernstrom | 426/1 |
| 3,854,234 | 12/1974 | Hardin | 426/1 |
| 4,143,161 | 3/1979 | Ciulla | 426/1 |
| 4,486,460 | 12/1984 | Kienast | 426/1 |
| 4,501,083 | 2/1985 | Ong | 43/42 |
| 4,710,385 | 12/1987 | Vickers | 43/4.5 |
| 4,826,691 | 5/1989 | Prochnow | 43/43.12 |

FOREIGN PATENT DOCUMENTS

| | | | |
|---|---|---|---|
| 2606593 | 5/1988 | France | 43/42 |
| 0138346 | 8/1982 | Japan | 426/1 |
| 1128845 | 6/1986 | Japan | 426/1 |

Primary Examiner—Kurt Rowan
Attorney, Agent, or Firm—Henderson & Sturm

[57] ABSTRACT

A superior fish attractant is formed which is particulate in nature by mixing together animal feed and flavoring for animal feed.

2 Claims, 1 Drawing Sheet

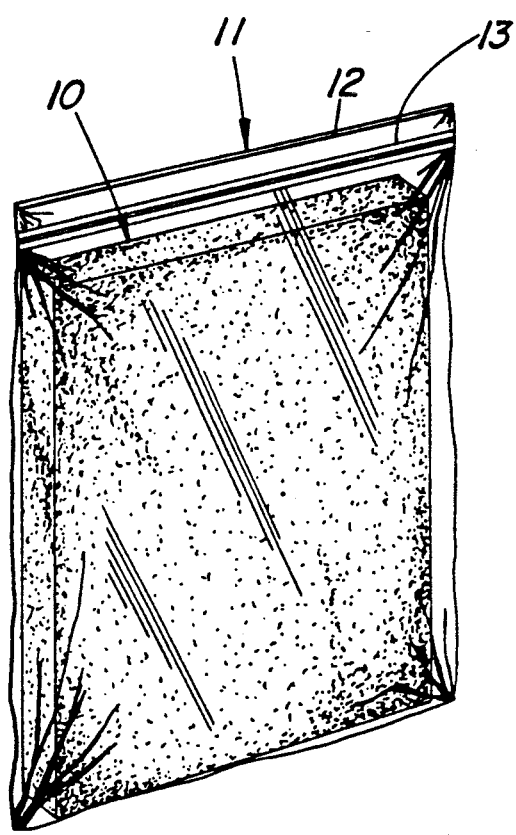

FISH ATTRACTANT

TECHNICAL FIELD

This invention relates broadly to baits employed on hooks or the like for catching fish. More specifically the invention relates to fish attractants, substances employed to enhance the effectiveness of the bait.

BACKGROUND ART

Chumming involves throwing chopped fish, vegetable matter, or small live fish overboard to draw fish to the fishing boat. The chum can be cumbersome and messy, other substances called fish attractants have been employed for some time now to make fish more aware of, and to lead them to, the bait employed by the fisherman. The attractants generally are liquid and are oil based. The bait is dipped into, or otherwise coated by the attractant. When the baited hook is deployed in the water, the attractant spreads from the bait into the water. However, standard attractants tend to float to the surface of the water and therefore have limited effectiveness in accomplishing their intended purpose.

DISCLOSURE OF INVENTION

The general object of this invention is to provide an improved fish attractant. A more specific object is provision of an attractant which masks human scent. A further object is to not only mask human scent but to scent the attractant in such fashion as to enhance its range of effectiveness in the water. An additional object is to provide an attractant so constructed as to more effectively spread into the water, thereby also enhancing its range of effectiveness. An additional objective is provision of a fish attractant which is applied to the bait by a method which is relatively less wasteful and messy.

These and other objects are accomplished by using a mixture of animal feed and flavoring for animal feed which is particulate in nature. The mixture is packaged in a resealable plastic bag. The particulate attractant mixture is applied to the bait by first placing the bait into a bag, shaking the bag, then removing the bait. When the bait is subsequently deployed in the water, the particulate attractant spreads in all directions from the bait.

BRIEF DESCRIPTION OF THE DRAWINGS

The fish attractant of this invention is illustrated in the drawings wherein FIG. 1 is a side-elevational view showing the fish attractant in a preferred container.

BEST MODE FOR CARRYING OUT THE INVENTION

The fish attractant is shown generally at (10) in a preferred package (11). The package (11) more particularly is a plastic bag having one end (12) which may be alternately opened and closed. A strip sealing seam (13), of a type well known in the art of plastic bags, is provided adjacent the end (12).

The fish attractant (10) is granular or particulate in structure. The attractant is a mixture of animal feed, such as normally employed for cattle, hogs or the like, and flavoring for animal feed, with a preferred mixture being approximately 50 percent by weight animal feed and 50 percent by weight flavoring.

In one example, an animal feed, entitled "Extra Grade Sweet Dairy Whey, Dry Sweet Whey," was employed, having a guaranteed analysis of crude protein minimum 11 percent, crude fat minimum 1 percent, crude fiber maximum 0 percent and lactose minimum 61 percent. Such a product is distributed for example by Land O'Lakes, Inc , of Arden Hills, MN, as product code 27231. One pound of this feed was placed in a mechanical mixing apparatus of common design.

The flavoring for animal feeds employed was entitled "Strawberry Buds for Swine", and is available from Quali Tech, Inc., of Chaska, MN. The ingredients of this flavoring are identified as natural and artificial flavor ingredients, BHT (a preservative), calcium carbonate and roughage products. One pound of this flavoring was placed in the mixing apparatus.

The mixing apparatus then was activated to thoroughly mix the animal feed and the flavoring. The resulting mixture then was packaged in bags (11) substantially the size illustrated in the drawing.

The fish attractant was employed with various baits, including worms, minnows and cut baits. The bait first was placed upon the hook. The bag with fish attractant was opened, and the baited hook dropped therein into the fish attractant mixture. The bag then was resealed and shaken until the bait was covered or coated with the attractant mixture, whereupon the bag was opened and the baited hook withdrawn. The natural moisture of the baits is sufficient for the fish attractant to adhere thereto. Plastic lures and the like can be treated with the fish attractant mixture as well; however, the fish attractant will adhere better in such cases if the lures first are slightly coated with a vegetable oil. By this method waste of the mixture is minimized, as the unused mixture is retained in the bag. Furthermore, use of the bag makes the operation of coating of the bait less messy, and the particulate nature of the mixture is inherently less messy than standard oil based fish attractants.

When the baited hook was deployed in the water, the fish attractant mixture particles spread from the bait into the water in substantially all directions, thereby creating a much larger area wherein fish became attracted to the bait. The strong flavoring effectively masked any fisherman's scent and further attracted the fish. Overall the mixture performed very satisfactorily in attracting fish to the bait.

The industrial applicability of this fish attractant invention is believed to be apparent from the foregoing description. Although a preferred embodiment has been disclosed herein, it is to be remembered that various alternate formulations can be made thereto without departing from the scope of this invention.

I claim:

1. A fist attractant composition comprising:
    about 50 percent by weight of an animal feed; and
    about 50 percent by weight of a flavoring for animal feed,
    said flavoring for animal feed being particulate and including strawberry flavor ingredients.

2. A method of treating bait comprising the steps of:
    forming a particulate fish attractant composition about 50 percent by weight of an animal feed and about 50 percent by weight of a flavoring for animal feed;
    placing a quantity of said fish attractant composition in a resealable container;
    placing the bait within the container;
    shaking the container until the bait is coated with the composition; and
    removing the coated bait from the container.

* * * * *